(12) United States Patent
Kelm et al.

(10) Patent No.: US 12,350,763 B2
(45) Date of Patent: Jul. 8, 2025

(54) WELDING SYSTEM DEVICE DETECTION

(71) Applicant: Lincoln Global, Inc., Santa Fe Springs, CA (US)

(72) Inventors: Jonathon C. Kelm, Willoughby, OH (US); William D. Wilder, Cleveland, OH (US); James P. Zucker, Aurora, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 826 days.

(21) Appl. No.: 17/381,386

(22) Filed: Jul. 21, 2021

(65) Prior Publication Data

US 2023/0027436 A1    Jan. 26, 2023

(51) Int. Cl.

| | |
|---|---|
| *B23K 9/09* | (2006.01) |
| *B23K 9/013* | (2006.01) |
| *B23K 9/095* | (2006.01) |
| *B23K 9/10* | (2006.01) |

(Continued)

(52) U.S. Cl.
CPC ............ *B23K 9/0956* (2013.01); *B23K 9/013* (2013.01); *B23K 9/092* (2013.01); *B23K 9/1062* (2013.01); *B23K 9/125* (2013.01); *B23K 9/32* (2013.01)

(58) Field of Classification Search
CPC ...... B23K 9/0956; B23K 9/013; B23K 9/092; B23K 9/1062; B23K 9/125; B23K 9/32; B23K 9/04; B23K 9/0953; B23K 9/1012; B23K 9/1056; B23K 9/167; B23K 9/173
See application file for complete search history.

(56) References Cited

U.S. PATENT DOCUMENTS

| | | | |
|---|---|---|---|
| 2004/0020907 A1* | 2/2004 | Zauner | B23K 9/0953 |
| | | | 219/130.21 |
| 2008/0296276 A1 | 12/2008 | Schartner et al. | |
| 2013/0277345 A1 | 10/2013 | Holverson et al. | |

(Continued)

FOREIGN PATENT DOCUMENTS

| | | |
|---|---|---|
| EP | 3 323 545 A1 | 5/2018 |
| JP | 2016-027683 A | 2/2016 |

OTHER PUBLICATIONS

International Search Report from Corresponding Application No. PCT/US2022/037836; Dated Dec. 8, 2022; pp. 1-5.

(Continued)

*Primary Examiner* — Tiffany T Tran
(74) *Attorney, Agent, or Firm* — Brad C. Spencer

(57) ABSTRACT

A welding system includes a welding power supply, wire feeder, and welding circuit connecting the power supply to the wire feeder. The power supply and the wire feeder are configured for bidirectional communication over the welding circuit. The power supply includes a voltage sensor that measures a voltage level, and a current sensor that measures a current level, on the welding circuit. The power supply is configured to operate in a first welding mode to output a power voltage level to the welding circuit to power the wire feeder in response to a communication from the wire feeder over the welding circuit. The power supply generates periodic voltage dip pulses on the welding circuit, and automatically switches to a second welding mode different from the first welding mode based on the voltage level on the welding circuit falling below a threshold voltage level during a voltage dip pulse.

13 Claims, 8 Drawing Sheets

(51) Int. Cl.
*B23K 9/12* (2006.01)
*B23K 9/32* (2006.01)

(56) References Cited

U.S. PATENT DOCUMENTS

| | | | |
|---|---|---|---|
| 2014/0001169 A1 | 1/2014 | Enyedy et al. | |
| 2014/0326706 A1 | 11/2014 | Dunahoo et al. | |
| 2016/0175969 A1 | 6/2016 | Denis | |
| 2017/0027028 A1* | 1/2017 | Segers | H05B 45/48 |
| 2018/0117718 A1 | 5/2018 | Rajagopalan et al. | |
| 2018/0126477 A1* | 5/2018 | Kooken | B23K 9/1336 |
| 2018/0354050 A1 | 12/2018 | DeCoster et al. | |
| 2019/0030635 A1 | 1/2019 | Fleming et al. | |
| 2020/0306859 A1 | 10/2020 | Fleming et al. | |
| 2021/0129250 A1* | 5/2021 | Vogel | B23K 9/0731 |

OTHER PUBLICATIONS

ESAB; "Welding Parameters and Techniques;" https://www.esabna.com/euweb/mig_handbook/592mig7_1.htm; Accessed on Jan. 4, 2021; p. 1.

Lincoln Electric; "Flextec 350X Operator's Manual;" Dated Nov. 2017; pp. 1-52.

Lincoln Electric; "Crosslinc Technology Full Control. Fewer Cables" brochure; Dated Apr. 2019; pp. 1-8.

\* cited by examiner

WELDING SYSTEM DEVICE DETECTION

BACKGROUND OF THE INVENTION

Field of the Invention

The present invention relates to systems for generating electrical arcs used in welding or welding-type processes (e.g., hardfacing, metal additive manufacturing, air carbon arc gouging, etc.) having a welding power supply and a separate wire feeder remote from the welding power supply.

Description of Related Art

It is known to provide a welding system having welding power supply and a separate, portable wire feeder located remote from the welding power supply. The wire feeder is connected welding power supply by cables and can be moved around a construction site to perform welding operations while the power supply remains stationary. Remote control of the welding power supply, such as making welding voltage or current adjustments, can be provided via a user interface at the wire feeder. Communications between the wire feeder and power supply can occur over a dedicated control cable or over a welding power cable that powers the wire feeder from the welding power supply. If communications between the welding power supply and wire feeder cease or become impossible, such as when the dedicated control cable becomes damaged, it would be desirable for the welding power supply to be able to determine whether the wire feeder is still connected to it.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding system comprising a welding power supply, a wire feeder, and a welding circuit connecting the welding power supply to the wire feeder. The welding power supply and the wire feeder are configured for bidirectional communication over the welding circuit. The welding power supply includes a voltage sensor that measures a voltage level on the welding circuit and a current sensor that measures a current level on the welding circuit. The welding power supply is configured to operate in a first welding mode to output a power voltage level to the welding circuit to power the wire feeder in response to a communication from the wire feeder over the welding circuit. The welding power supply generates periodic voltage dip pulses on the welding circuit, and the welding power supply automatically switches to a second welding mode different from the first welding mode based on the voltage level on the welding circuit falling below a threshold voltage level during a voltage dip pulse.

In accordance with another aspect of the present invention, provided is welding system comprising a welding power supply, a wire feeder, and a welding circuit connecting the welding power supply to the wire feeder. The welding power supply and the wire feeder are configured for bidirectional communication over the welding circuit. The welding power supply includes a voltage sensor that measures a voltage level on the welding circuit and a current sensor that measures a current level on the welding circuit. The welding power supply is configured to operate in a first welding mode to output a power voltage level to the welding circuit to power the wire feeder in response to a communication from the wire feeder over the welding circuit. The welding power supply generates periodic voltage dip pulses on the welding circuit when the current level on the welding circuit is below a threshold current level, and then automatically switches to a second welding mode different from the first welding mode based on the voltage level on the welding circuit falling below a threshold voltage level during a voltage dip pulse.

In accordance with another aspect of the present invention, provided is a welding system comprising a welding power supply, a wire feeder, and a welding circuit connecting the welding power supply to the wire feeder. The welding power supply includes a voltage sensor that measures a voltage signal on the welding circuit. The welding power supply is configured to output a DC power voltage to the welding circuit with periodic voltage dip pulses from a first voltage level to a second voltage level lower than the first voltage level. The welding power supply is configured to determine whether the wire feeder is connected to the welding circuit from a voltage level of the voltage signal on the welding circuit during a voltage dip pulse, and, when the wire feeder is determined to be disconnected from the welding circuit, automatically switch a mode of the welding power supply to one of a shielded metal arc welding mode, a gas tungsten arc welding mode, and a constant voltage arc welding mode.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
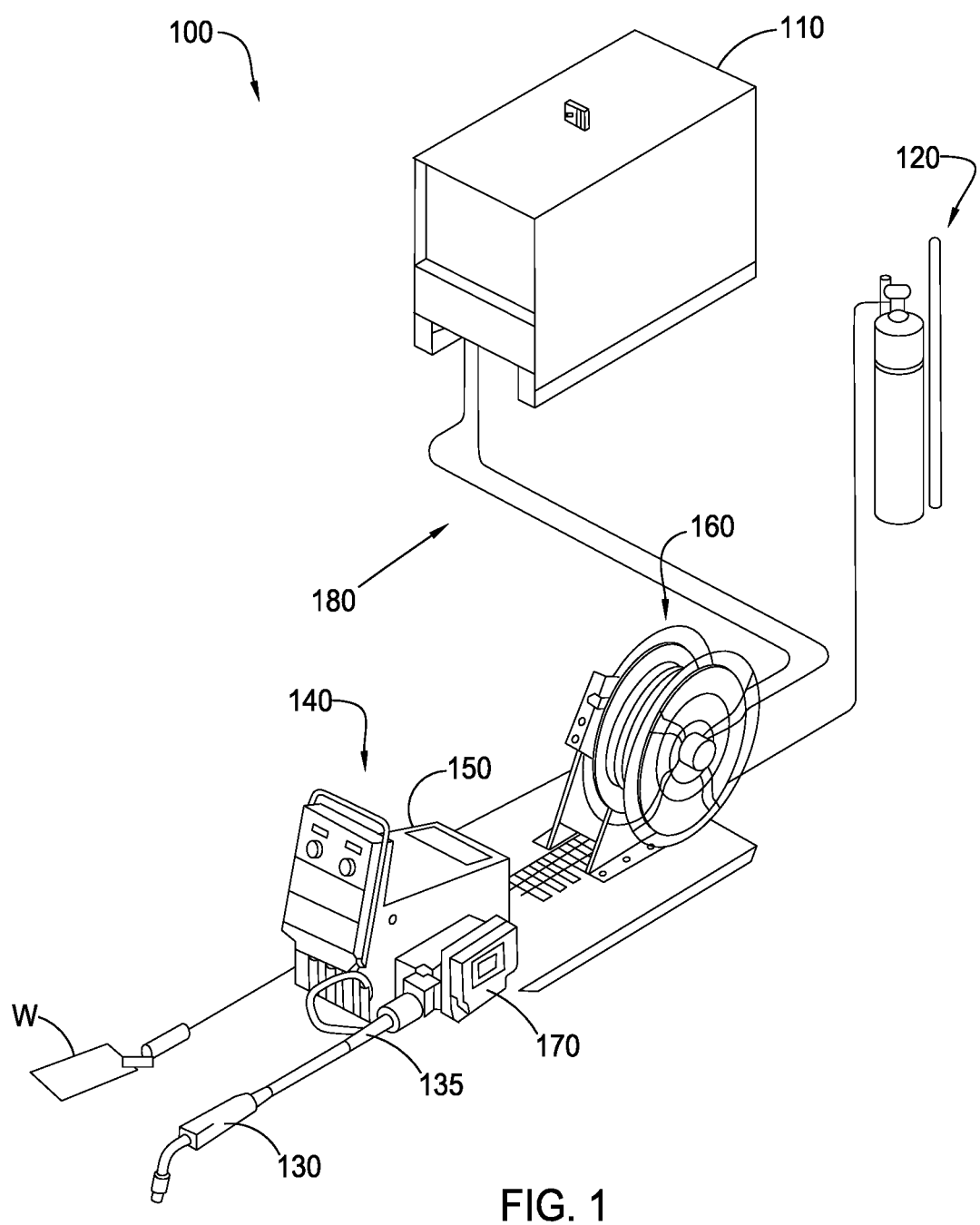
FIG. 1 is a perspective view of a welding system.

The present invention relates to welding systems having a welding power supply and a separate wire feeder remote from the welding power supply. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

While embodiments of the present invention described herein are discussed in the context of a gas metal arc welding (GMAW) system, other embodiments of the invention are not limited thereto. For example, embodiments can be utilized in shielded metal arc welding (SMAW), flux-cored arc welding (FCAW), metal-cored arc welding (MCAW), gas tungsten arc welding (GTAW) as well as other similar types of welding operations. Further, embodiments of the present invention can be used in manual, semi-automatic and robotic welding operations. Embodiments of the present invention can also be used in metal deposition operations that are similar to welding, such as additive manufacturing, hardfacing, and cladding, and in metal removing operations such as air carbon arc gouging (hereinafter "arc gouging). As used herein, the term "welding" is intended to encompass all of these technologies or operations. Therefore, in the interests of efficiency, the term "welding" is used below in the description of exemplary embodiments, but is intended to include all of these electrical arc operations, whether or not joining of multiple workpieces occurs.

FIG. 1 illustrates an exemplary embodiment of an arc welding system 100. The system 100 includes a welding power supply 110, a welding wire feeder 140, a welding wire source 160, a gas source 120, and a welding gun or torch 130. The wire feeder 140 includes a housing 150 and a wire gripping device 170. On the housing 150 is a user interface and within the housing are power and control circuitry and a motor that drives the wire gripping device 170. The wire gripping device 170 pulls a welding wire electrode from the welding wire source 160 (e.g., spool, drum, etc.) through the wire gripping device 170 and into the welding torch 130 via a welding cable 135. If desired, the welding wire source 160 can be mounted within the housing 150. A welding circuit 180 connects the welding power supply 110 to the wire feeder 140. The welding circuit 180 can include positive and negative power leads or cables connected to output terminals on the welding power supply 110 and to input terminals on the wire feeder. The welding power supply 110 powers the wire feeder 140 via the welding circuit 180 so that a welding operation can be performed on a workpiece W using the welding torch 130. Moreover, the welding power supply 110 and the wire feeder 140 can communicate bidirectionally with each other over the welding circuit 180. The bidirectional communications can include commands, settings or welding parameters such as voltage or current settings, modes or operation, device identifications, monitored conditions such as actual welding voltage and current levels or short circuit events, alarms, etc.

Figure 2:
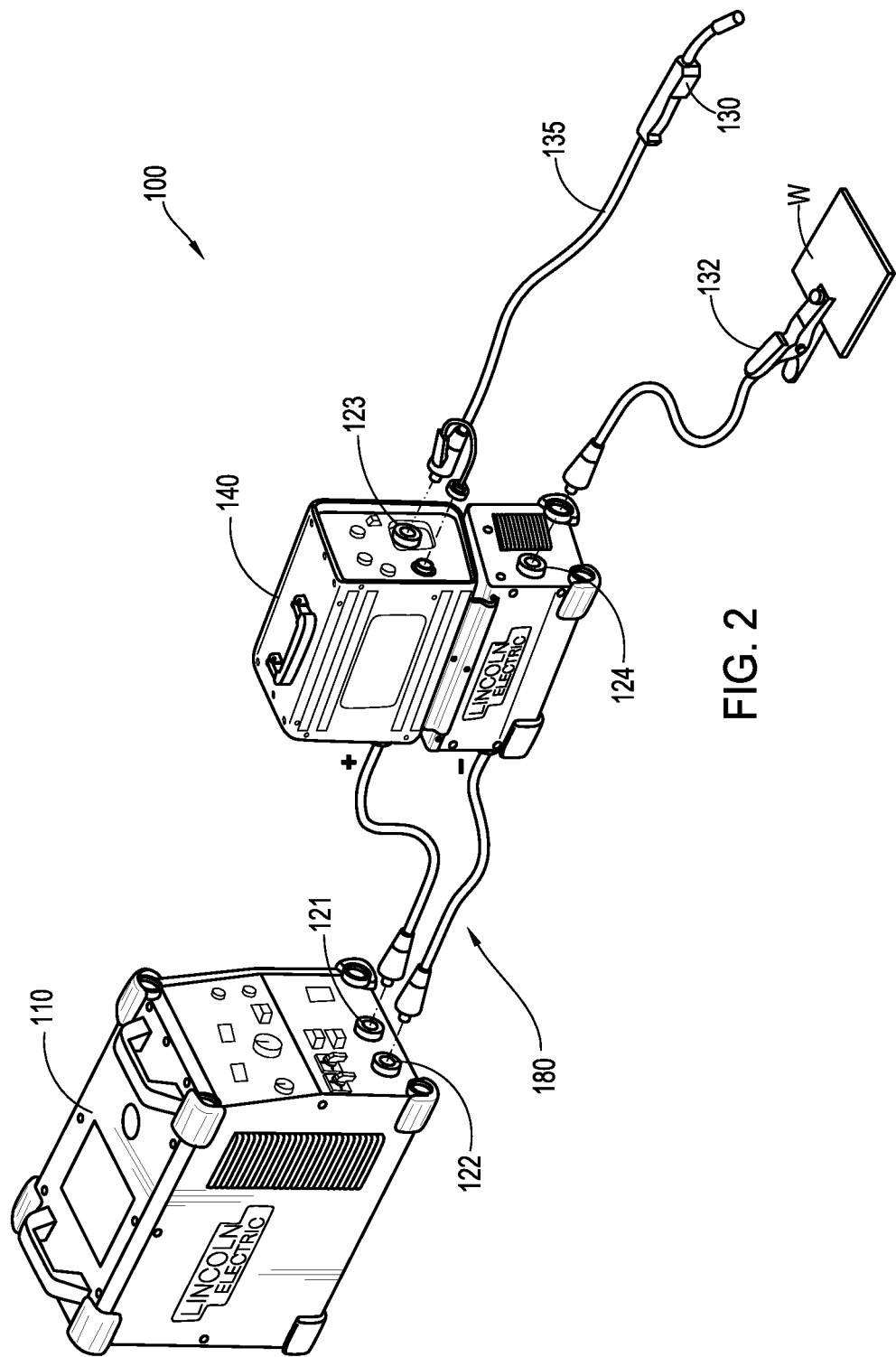
FIG. 2 is a perspective view of a welding system.

FIG. 2 illustrates a further embodiment of an arc welding system 100. A gas source is not shown in FIG. 2 but could be included if desired. User interfaces and electrical terminals on the welding power supply 110 and wire feeder 140 are shown in greater detail in FIG. 2. It can be seen that the wire feeder 140 is connected to positive 121 and negative 122 output terminals on the welding power supply 110 via the welding circuit 180. The welding torch 130 and a work clamp 132 are connected to respective output terminals 123, 124 on the wire feeder. The portability of the wire feeder 140 can also be seen in FIG. 2 via a handle on top of the wire feeder housing.

Figure 3:
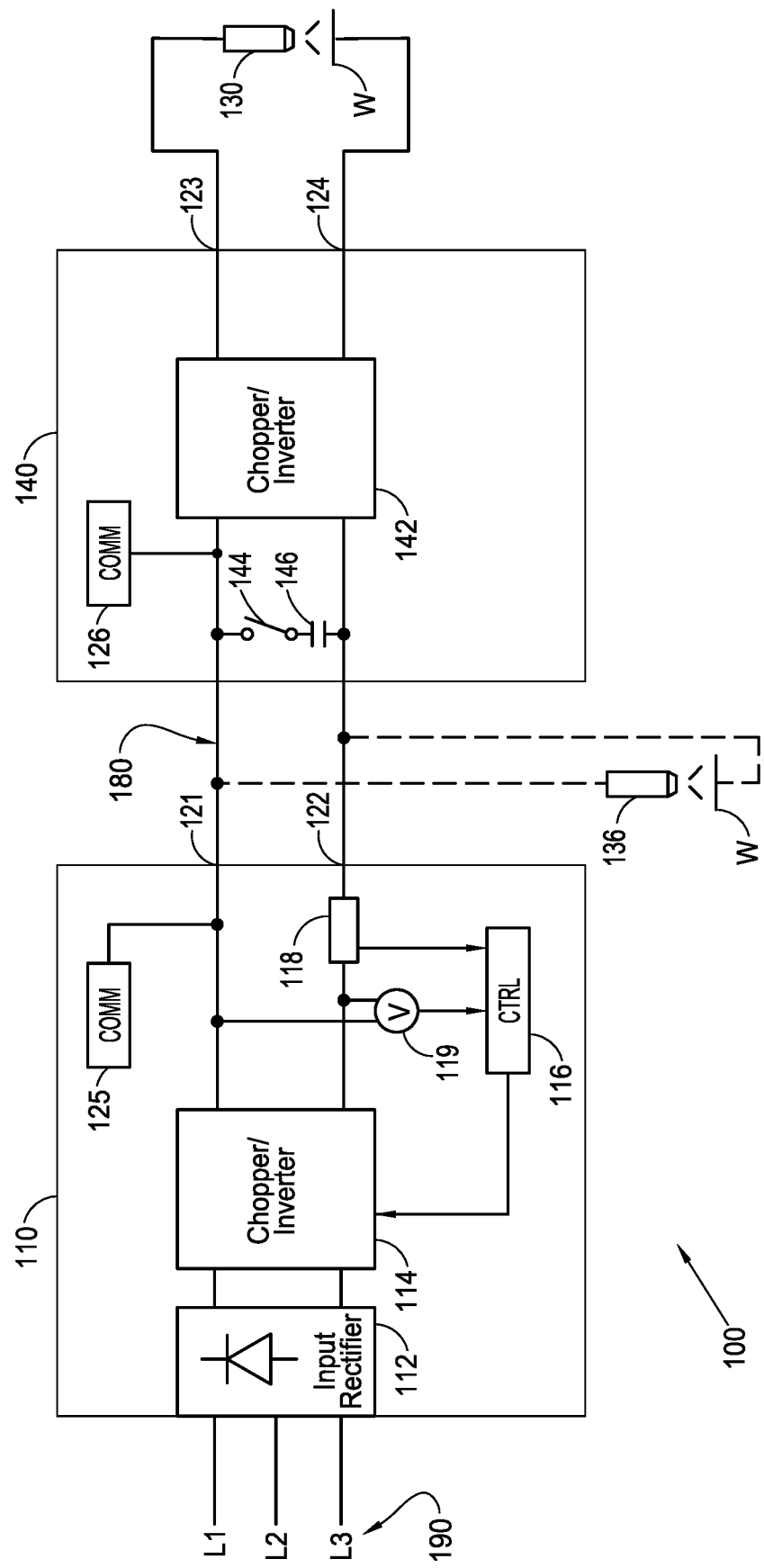
FIG. 3 is a schematic diagram of the welding system.
Figure 4:
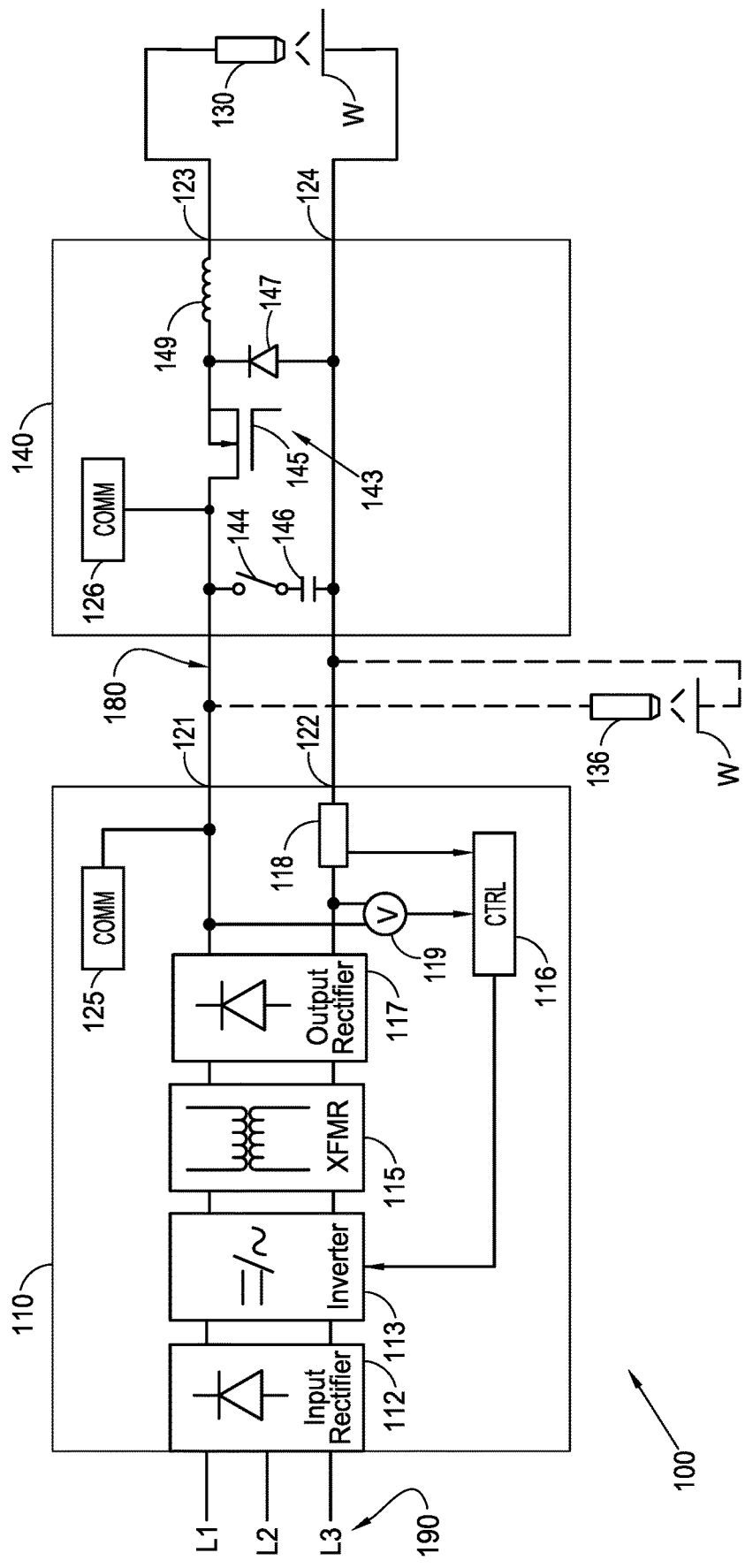
FIG. 4 is a schematic diagram of the welding system.

A schematic diagram of an example arc welding system 100 is shown in FIG. 3. The arc welding system 100 includes the welding power supply 110 and wire feeder 140 connected by the welding circuit 180. The welding power supply 110 receives electrical energy for performing welding operations or powering the wire feeder 140 from a power source 190, such as a commercial power source or a generator. The power source 190 can be a single phase or three phase power source. In certain embodiments, the arc welding system 100 can be a hybrid system that includes one or more batteries (not shown) that also supply energy to the welding power supply 110. The welding power supply 110 includes a switching type power converter for generating an output voltage signal or a welding arc according to a desired welding waveform. Example switching type power converters include DC choppers, inverters, buck boost converters, and the like. AC power from the power source 190 is rectified by an input rectifier 112 within the welding power supply 110. The DC output from the rectifier 112 is supplied to a switching circuit, such as chopper or inverter 114. If the welding power supply 110 includes an inverter, the inverter can supply high-frequency AC power to a transformer, and the output of the transformer can be rectified to DC power for generating a welding arc or powering the wire feeder 140. An inverter-based welding power supply is schematically shown in FIG. 4.

The welding power supply 110 includes a controller 116 operatively connected to the chopper or inverter 114, for controlling the welding waveforms or power output generated by the welding power supply. The controller 116 can provide a waveform control signal to the chopper or inverter 114 to control its output. The controller 116 controls the output of the chopper or inverter 114 via the waveform control signal, to achieve a desired welding waveform, welding voltage, welding current, power voltage level, pulse signal, communication signal, etc. The waveform control signal can comprise a plurality of separate control signals for controlling the operation of various switches (e.g., transistor switches) within the chopper or inverter 114. The controller 116 monitors various aspects of the welding process via feedback signals. For example, a current sensor 118, such as a current transformer (CT) or shunt, can provide a welding current feedback signal to the controller 116, and a voltage sensor 119 can provide a welding voltage feedback signal to the controller.

The controller 116 can be an electronic controller and may include a processor. The controller 116 can include one or more of a microprocessor, a microcontroller, a digital signal processor (DSP), an application specific integrated circuit (ASIC), a field-programmable gate array (FPGA), discrete logic circuitry, or the like. The controller 116 can include a memory portion (e.g., RAM or ROM) storing program instructions that cause the controller to provide the functionality ascribed to it herein. The controller 116 can include a plurality of physically separate circuits or electronic devices, such as a processor in combination with separate comparators, logic circuits, etc. However, for ease of explanation, the controller 116 is shown as a monolithic device.

The welding power supply 110 can include communication circuitry 125, such as a transceiver, for performing bidirectional communications with the wire feeder 140 across the welding circuit 180. The communication circuitry 125 could be operatively connected to the controller 116 to exchange information therewith. Although the communication circuitry 125 is shown as a separate device from the controller 116, it could be incorporated into the controller if desired.

As noted above, an inverter-based welding power supply 110 is schematically shown in FIG. 4. AC power from the power source 190 is rectified by the input rectifier 112. The DC output from the rectifier 112 is supplied to an inverter 113 in the welding power supply 110. The inverter 113 supplies high-frequency AC power to a transformer 115, and the output of the transformer is converted back to DC by an output rectifier 117. An example inverter-based welding power supply 110 for use in the welding system 100 is a FLEXTEC 350X available from The Lincoln Electric Company of Cleveland, Ohio.

The wire feeder 140 is powered by the welding power supply 110 via the welding circuit cables that extend between the power output terminals 121, 122 on the welding power supply and power input terminals on the wire feeder. Like the welding power supply 110, the wire feeder 140 can include a switching type power converter, such as a chopper or inverter 142 for generating welding waveforms during welding. Although not shown in FIG. 3, it is to be appreciated that the wire feeder 140 can include one or more electronic controllers, similar to the controllers described above with respect to the welding power supply 110, for controlling the operations of the chopper or inverter 142 and performing bidirectional communications with the welding power supply 110 across the welding circuit 180. The wire feeder 140 can also include welding current and voltage sensors, similar to those described above with respect to the welding power supply 110. The chopper or inverter 142 is controlled to generate desired welding waveforms during a welding operation, which may be GMAW, FCAW, MCAW, etc. The output of the chopper or inverter 142 is connected to the welding torch and workpiece W to perform the welding operation. An example chopper circuit 143 is shown schematically in FIG. 4 and includes a transistor switch 145, a diode 147, and an inductor 149. Although a chopper circuit is shown in FIG. 4, it is just one example of a switching type power converter that could be employed in the wire feeder. Other examples of switching type power converters include inverters and buck boost converters.

The wire feeder 140 can include communication circuitry 126, such as a transceiver, for performing bidirectional communications with the welding power supply 110 across the welding circuit 180. The communication circuitry 126 could be incorporated into a controller for the wire feeder if desired, or be operatively connected to such a controller to exchange information with the controller.

The wire feeder 140 further includes a contactor 144 and a capacitor 146 electrically connected in series across the welding circuit 180. The capacitor 146 maintains the input power voltage level to the wire feeder 140 and is switched into the welding circuit 180 by the contactor 144 prior to the performance of a welding operation by the wire feeder 140.

The capacitor 146 is large and could comprise a plurality of individual capacitors connected electrically in parallel. An example size of the capacitor 146, or total capacitance provided by parallel capacitors, is greater than 30,000 microfarads. In an example embodiment, the capacitor 146 is 32,800 microfarads and is formed by four 8,200 microfarad capacitors connected in parallel. When switched into the welding circuit 180, the large capacitor 146 prevents the bidirectional communications between the wire feeder 140 and welding power supply 110 over the welding circuit 180 from occurring. For example, current and/or voltage signals that encode the bidirectional communication messages become unreadable or indecipherable when the capacitor 146 is switched into the welding circuit 180. Accordingly, when the contactor 144 is in a closed state, bidirectional communications between the welding power supply 110 and the wire feeder 140 are disabled because they cannot effectively occur. The bidirectional communications are enabled when the contactor is in an open state.

Disabling the communications over the welding circuit 180 can be problematic in that the welding power supply 110 would not know if the wire feeder 140 has been turned off or disconnected from the welding power supply. An operator may want to perform a different welding process directly from the welding power supply (i.e., without the wire feeder) and, thus, turn off or disconnect the wire feeder. Examples of such different welding processes include, but are not limited to, SMAW, GTAW, a constant voltage (CV) process different from the welding process performed using the wire feeder, and arc gouging. If the welding power supply 110 does not know that the wire feeder 140 has been turned off or disconnected because communications are disabled, the operator would have to manually switch welding modes for a different welding process via the user interface of the welding power supply. Discussed below is a technique implemented by the welding power supply 110 to determine whether the wire feeder 140 remains on and connected to the welding power supply subsequent to a welding operation performed by the wire feeder. While operating in a first welding mode in which the welding power supply 110 outputs a power voltage level to the welding circuit 180 to power the wire feeder, the welding power supply generates brief, periodic voltage dip pulses on the welding circuit. The voltage dip pulses are short and infrequent enough so as not to disrupt power to the wire feeder 140. If the wire feeder 140 is still on and connected to the welding power supply 110, its contactor 146 will be in the closed state and its capacitor 146 will prevent the voltage level on the welding circuit 180 from fluctuating much due to the voltage dip pulses. By monitoring the voltage level on the welding circuit 180 during a voltage dip pulse or pulses, the welding power supply 110 can determine whether or not the wire feeder 140 is on/connected. If the wire feeder 140 is determined to still be on/connected, the welding power supply 110 remains in the first welding mode to maintain power to the wire feeder. If the wire feeder 140 is determined to be off or disconnected, the welding power supply 110 automatically switches to a different, preset welding mode having different stored welding parameters for a different welding process (SMAW, GTAW, a CV process, arc gouging, etc.) The different welding mode and/or parameters can be preset by the operator. In an example embodiment, the welding power supply automatically switches to any one of the following arc welding modes when the wire feeder 140 is determined to be off or disconnected: SMAW, GTAW, CV, and arc gouging. The SMAW and GTAW modes can be constant current (CC)

processes, and the arc gouging mode could be either a CC or CV process. FIGS. 3 and 4 schematically illustrate an additional torch 136 connected to the output of the welding power supply 110 for performing the different welding process on a further workpiece W.

When supplying power to the wire feeder 140, the welding power supply 110 regulates an open circuit voltage (OCV) on the welding circuit 180. Example ranges for the OCV are between 50 VDC and 100 VDC or between 60 VDC and 80 VDC, although other voltage ranges above 100 VDC and below 50 VDC are possible. The welding power supply 110 automatically switches into this first welding mode in response to a communication from the wire feeder 140 over the welding circuit 180. The communication can include an identification of the wire feeder 140 and settings or parameters for the welding power supply 110 for use during welding by the wire feeder, such as the OCV level. At this point, which is prior to welding by the wire feeder 140, the contactor 144 in the wire feeder is still open and bidirectional communications between the welding power supply and the wire feeder remain enabled. Bidirectional communications between the wire feeder 140 and welding power supply 110 will be disabled during welding. However, during welding the welding power supply 110 can monitor the current level and the voltage level on the welding circuit 180 via its current sensor 118 and voltage sensor 119, respectively. The welding power supply 110 can determine that a welding operation may be completed when the current level on the welding circuit falls below a threshold level. During welding, the current level will be high, such as several hundred amps. But when welding ceases, the current level will drop to near zero amps. By comparing the current level in the welding circuit 180 to a threshold current level, the welding power supply 110 can determine that welding may be completed. An example range for the threshold current level is between 0 A and 50 A. In an example embodiment, the welding power supply 110 determines that a welding operation by the wire feeder 140 may be completed when the current level on the welding circuit falls within the range of OA to 50A, such as to 10A or less.

Figure 5:
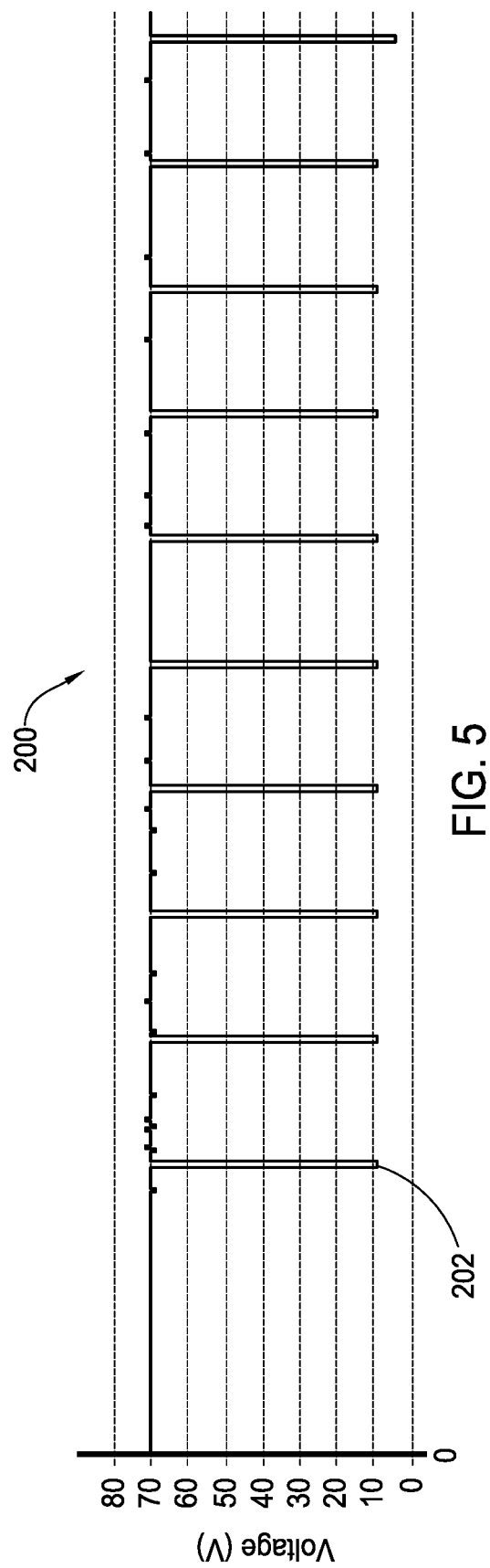
FIG. 5 shows an example voltage waveform generated by a welding power supply.
Figure 6:
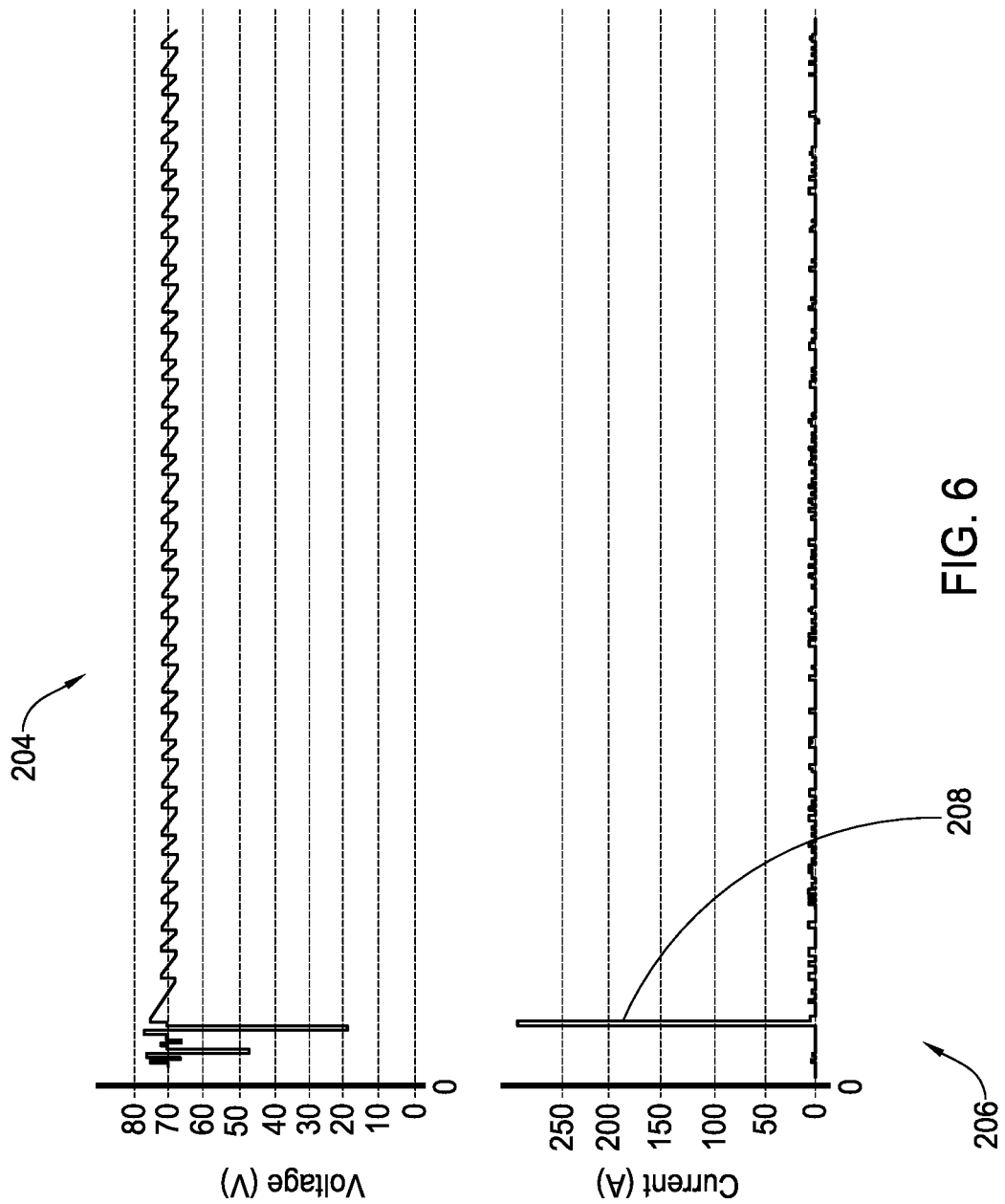
FIG. 6 shows example voltage and current waveforms on a welding circuit.

The welding power supply 110 will not automatically switch to a second, different welding mode if it is still connected to the wire feeder 140 and the wire feeder is turned on because additional welding operations by the wire feeder are likely to be forthcoming. To determine if the wire feeder 140 is on and still connected to the welding power supply 110, the welding power supply begins generating periodic voltage dip pulses on the welding circuit 180 when the current level on the welding circuit falls below the threshold current level (e.g., to 10A or less). Alternatively, the welding power supply 110 could begin generating voltage dip pulses as soon as bidirectional communications with the wire feeder 140 are disabled. An example voltage waveform 200 with voltage dip pulses 202 generated by the welding power supply is shown in FIG. 5. It can be seen that the average OCV for powering the wire feeder is 70 VDC in FIG. 5. The voltage dip pulses 202 are brief, periodic drops in voltage from the average OCV for powering the wire feeder. The voltage dip pulses 202 are short in duration (e.g., less than 10 ms) and spaced out (e.g., less than 2 Hz) so as not to power off the wire feeder. The duration of the voltage dip pulses 202 can be greater than 10 ms if desired and the frequency of the pulses greater than 2 Hz as long as the voltage dip pulses do not disrupt power to the wire feeder. In the example embodiment shown in FIG. 5, the voltage dip pulses drop from the average OCV (e.g., 70 VDC) to a 10 VDC command voltage for a duration of 5 ms and at a frequency of 1 Hz. If the wire feeder is disconnected from the welding circuit or is turned off, the voltage waveform on the welding circuit as measured by the voltage sensor in the welding power supply will appear substantially as shown in FIG. 5. However, if the wire feeder is connected and turned on with the contactor in the closed state, the measured voltage waveform 204 on the welding circuit will not fluctuate much (e.g., within ±5V), as shown in FIG. 6. The voltage waveform 204 in FIG. 6 is relatively stable around the average OCV (e.g., 70 VDC), as compared to waveform 200 in FIG. 5, due to the large capacitor in the wire feeder. To determine whether to automatically switch to a different welding mode, the welding power supply compares the voltage level on the welding circuit measured by the voltage sensor during a voltage dip pulse to a threshold voltage level. If the measured voltage level falls to or below the threshold voltage level during a voltage dip pulse, then the welding power supply knows that the wire feeder is off or disconnected (i.e., the large capacitor is not present in the welding circuit). The welding power supply then automatically switches to a different preset default welding mode (e.g., SMAW, GTAW, CV with different parameter settings, or arc gouging) for a different welding operation to be performed by the welding power supply. An example range of threshold voltage levels is 15-20V. For example, if the voltage level on the welding circuit falls below 15V during a voltage dip pulse, then the welding power supply will determine that the wire feeder is off/disconnected and automatically switch to the second welding mode. If the voltage level on the welding circuit does not fall below the threshold voltage level, the large capacitor is present in the welding circuit and the welding power supply will remain in the first welding mode to power the wire feeder. The threshold voltage level for determining whether the wire feeder is off/disconnected can be based on the magnitude of the voltage reduction of the voltage dip pulses. For example, greater voltage dips will have a corresponding lower threshold voltage level than smaller voltage dips.

As discussed above, in response to a communication from the wire feeder over the welding circuit, the welding power supply automatically switches into a welding mode in which the welding power supply outputs an OCV to the welding circuit to power the wire feeder. Prior to receiving the communication from the wire feeder, the welding power supply could be in any welding mode, such as the default welding mode to which it automatically switches when the wire feeder is disconnected, or some other welding mode discussed above.

Referring to FIG. 6, an example current waveform 206 on the welding circuit is shown. The current waveform 206 illustrates the current level in the welding circuit when the contactor in the wire feeder is closed but active welding is not occurring, and the welding power supply is generating the periodic voltage dip pulses. The current level is approximately OA for most of the waveform 206 because active welding is not occurring. However, a current spike 208 occurs when the contactor closes due to an inrush current to the capacitor. In certain embodiments, the welding power supply can determine that the contactor has switched from an open state to a closed state by detecting the current spike 208. The welding power supply can cease or disable communications over the welding circuit when the current spike 208 is detected.

Figure 7:
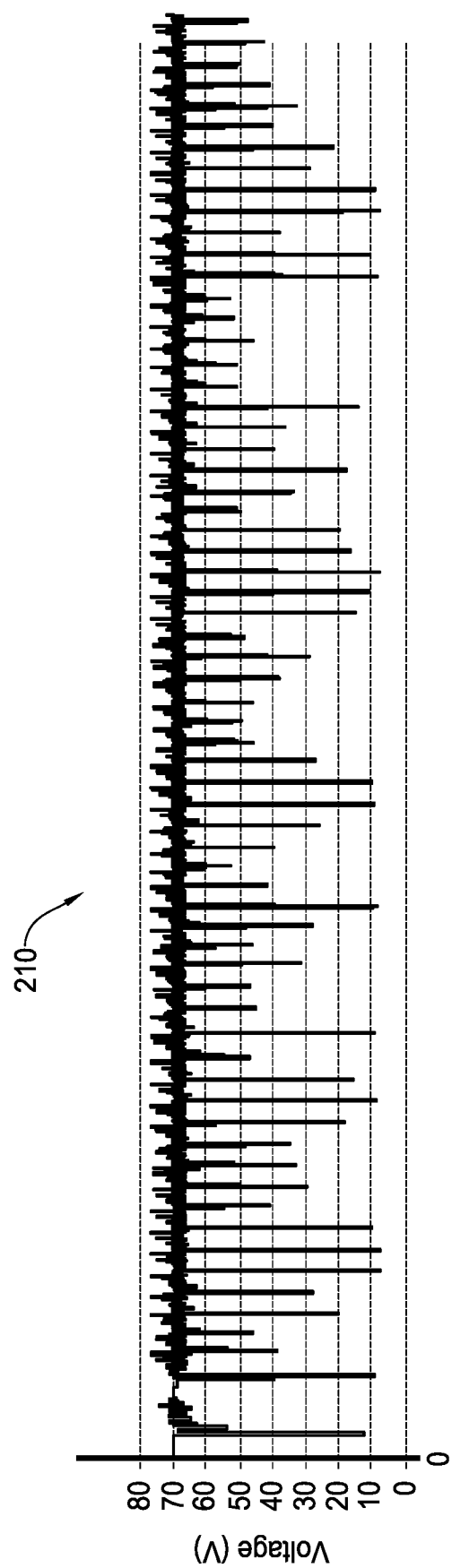
FIG. 7 shows a further example voltage waveform on a welding circuit.

FIG. 7 shows an example voltage waveform 210 on the welding circuit as the welding power supply outputs an OCV to power the wire feeder along with periodic voltage dip pulses while the wire feeder is connected to the welding circuit and turned on but with its contactor in the open state. The welding power supply outputs a voltage waveform as shown in FIG. 5, but the measured voltage waveform 240 on the welding circuit is as shown in FIG. 7. Bidirectional communications between the welding power supply and wire feeder are enabled because the contactor in the wire feeder is in the open state. Based on the large voltage fluctuations in the voltage waveform 210, it would appear that the wire feeder is disconnected (e.g., the measured voltage level on the welding circuit would fall below the threshold level discussed above during a voltage dip pulse). However, because bidirectional communications are enabled, the welding power supply will know that the wire feeder is connected and turned on via its communications with the wire feeder.

In certain embodiments, the welding power supply can use voltage and current measurements to determine what wire feeder, from a plurality of possible different wire feeders, is connected to the welding circuit. This can be done by making impedance calculations from the measured voltage and current on the welding circuit. The different wire feeders can have different impedance signatures, and by comparing the calculated impedance to stored reference impedances, the welding power supply can determine the connected wire feeder. The welding power supply can calculate one or more of the following impedances to identify the wire feeder: a resistance value, an inductance value, a capacitance value, an inductive reactance value, and a capacitive reactance value. The impedances can be calculated from the voltage and current measurements made by the welding power supply and from the rate of change of the voltage and current (e.g., their first derivatives).

Figure 8:
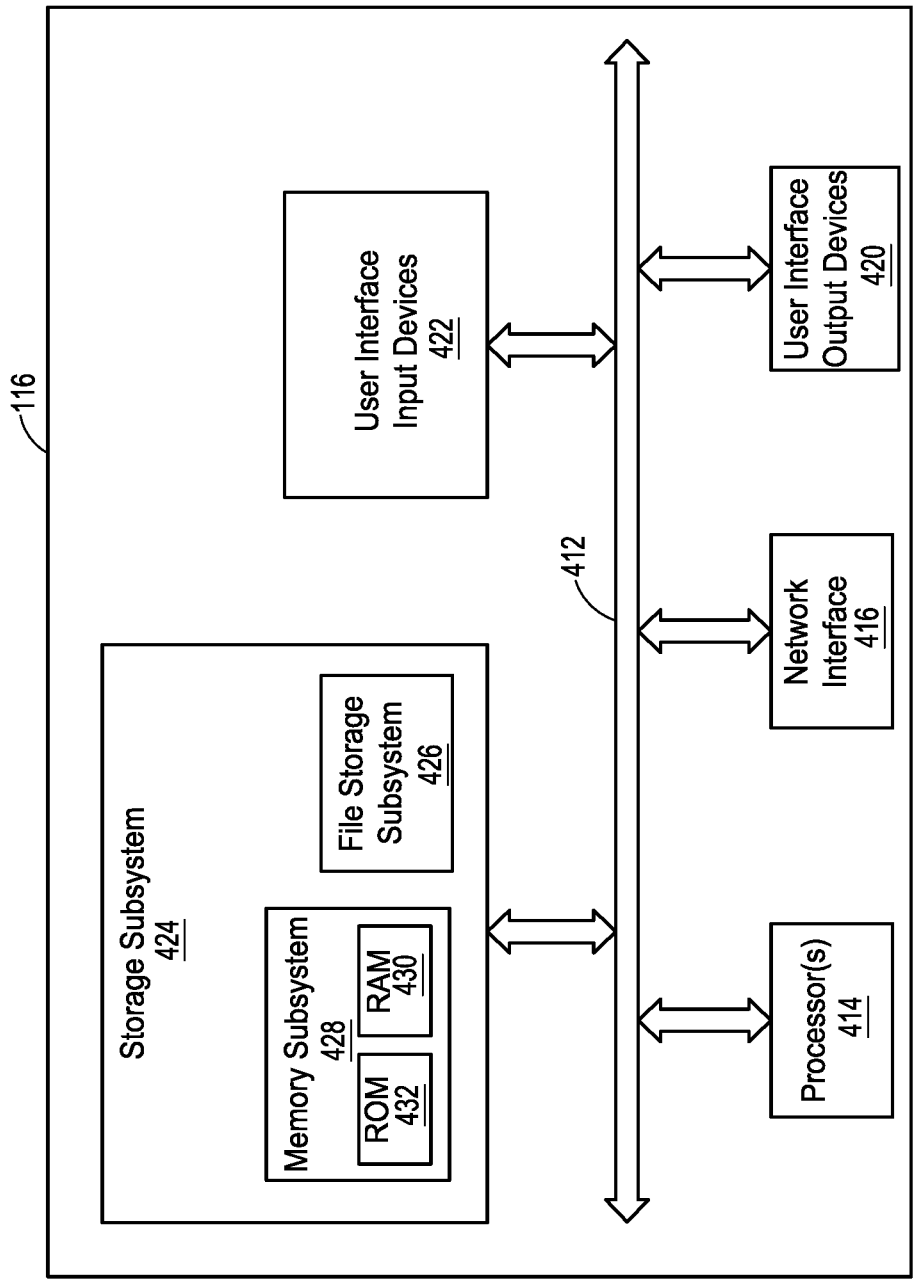
FIG. 8 illustrates an example controller.

FIG. 8 illustrates an embodiment of an example controller 116 of the welding power supply. The controller 116 includes at least one processor 414 which communicates with a number of peripheral devices via bus subsystem 412. These peripheral devices may include a storage subsystem 424, including, for example, a memory subsystem 428 and a file storage subsystem 426, user interface input devices 422, user interface output devices 420, and a network interface subsystem 416. The input and output devices allow user interaction with the controller 116. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 116 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 116 to the user or to another machine or computer system.

Storage subsystem 424 provides a non-transitory, computer-readable storage medium that stores programming and data constructs that provide the functionality of some or all of the control algorithms and software modules described herein. These software modules are generally executed by processor 414 alone or in combination with other processors. Memory 428 used in the storage subsystem can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a flash or solid-state drive, a floppy disk drive along with associated removable media, a CD-ROM drive, an optical drive, or removable media cartridges. The modules implementing the functionality of certain embodiments may be stored by file storage subsystem 426 in the storage subsystem 424, or in other machines accessible by the processor(s) 414.

Bus subsystem 412 provides a mechanism for letting the various components and subsystems of the controller 116 communicate with each other as intended. Although bus subsystem 412 is shown schematically as a single bus, alternative embodiments of the bus subsystem may use multiple buses.

Many other configurations of the controller 116 are possible having more or fewer components than the controller depicted in FIG. 8.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding system, comprising:
a welding power supply;
a wire feeder; and
a welding circuit connecting the welding power supply to the wire feeder, wherein:
the welding power supply and the wire feeder are configured for bidirectional communication over the welding circuit,
the welding power supply includes a voltage sensor that measures a voltage level on the welding circuit and a current sensor that measures a current level on the welding circuit, and
the welding power supply is configured to operate in a first welding mode to output a power voltage level to the welding circuit to power the wire feeder in response to a communication from the wire feeder over the welding circuit, and the welding power supply generates periodic voltage dip pulses on the welding circuit, and the welding power supply automatically switches to a second welding mode different from the first welding mode based on the voltage level on the welding circuit falling below a threshold voltage level during a voltage dip pulse of the periodic voltage dip pulses, and
the wire feeder includes a capacitor and a contactor electrically connected in series, and when the contactor is in a closed state, bidirectional communications between the welding power supply and the wire feeder are disabled.

2. The welding system of claim 1, wherein the second welding mode is a shielded metal arc welding mode.

3. The welding system of claim 1, wherein the second welding mode is a constant voltage arc welding mode.

4. The welding system of claim 1, wherein the second welding mode is an arc gouging mode.

5. The welding system of claim 1, wherein the welding power supply generates the periodic voltage dip pulses based on the current level on the welding circuit falling below a threshold current level.

6. The welding system of claim 1, wherein the capacitor prevents the voltage level on the welding circuit from falling below the threshold voltage level during the periodic voltage dip pulses when the contactor is in the closed state.

7. The welding system of claim 6, wherein a frequency of the periodic voltage dip pulses is less than 2 Hz and a duration of the voltage dip pulse is less than 10 ms.

8. A welding system, comprising:
a welding power supply;
a wire feeder; and
a welding circuit connecting the welding power supply to the wire feeder, wherein:
the welding power supply and the wire feeder are configured for bidirectional communication over the welding circuit,
the welding power supply includes a voltage sensor that measures a voltage level on the welding circuit and a current sensor that measures a current level on the welding circuit, and
the welding power supply is configured to operate in a first welding mode to output a power voltage level to the welding circuit to power the wire feeder in response to a communication from the wire feeder over the welding circuit, and the welding power supply generates periodic voltage dip pulses on the welding circuit when the current level on the welding circuit is below a threshold current level, and then automatically switches to a second welding mode different from the first welding mode based on the voltage level on the welding circuit falling below a threshold voltage level during a voltage dip pulse of the periodic voltage dip pulses, and
the wire feeder includes a capacitor and a contactor electrically connected in series, and when the contactor is in a closed state, bidirectional communications between the welding power supply and the wire feeder are disabled.

9. The welding system of claim 8, wherein the second welding mode is a shielded metal arc welding mode.

10. The welding system of claim 8, wherein the second welding mode is a constant voltage arc welding mode.

11. The welding system of claim 8, wherein the second welding mode is an arc gouging mode.

12. The welding system of claim 8, wherein the capacitor prevents the voltage level on the welding circuit from falling below the threshold voltage level during the periodic voltage dip pulses when the contactor is in the closed state.

13. The welding system of claim 12, wherein a frequency of the periodic voltage dip pulses is less than 2 Hz and a duration of the voltage dip pulse is less than 10 ms.

\* \* \* \* \*